(12) United States Patent
Xu et al.

(10) Patent No.: US 8,959,014 B2
(45) Date of Patent: Feb. 17, 2015

(54) TRAINING ACOUSTIC MODELS USING DISTRIBUTED COMPUTING TECHNIQUES

(75) Inventors: Peng Xu, San Jose, CA (US); Fernando Pereira, Palo Alto, CA (US); Ciprian I. Chelba, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 13/539,225

(22) Filed: Jun. 29, 2012

(65) Prior Publication Data

US 2013/0006612 A1    Jan. 3, 2013

Related U.S. Application Data

(60) Provisional application No. 61/503,334, filed on Jun. 30, 2011, provisional application No. 61/608,753, filed on Mar. 9, 2012.

(51) Int. Cl.
| | |
|---|---|
| G06F 17/21 | (2006.01) |
| G06F 17/20 | (2006.01) |
| G10L 15/08 | (2006.01) |
| G10L 15/14 | (2006.01) |
| G10L 15/187 | (2013.01) |
| G10L 15/04 | (2013.01) |
| G10L 15/34 | (2013.01) |

(52) U.S. Cl.
CPC ............... *G10L 15/187* (2013.01); *G10L 15/34* (2013.01)
USPC ............................ 704/10; 704/255; 704/256.4

(58) Field of Classification Search
USPC ............... 704/1–10, 236–240, 249, 255–257, 704/E17.001–E17.016, E15.001–E15.05, 704/E11.001–E11.007
See application file for complete search history.

(56) References Cited

U.S. PATENT DOCUMENTS

| | | | | |
|---|---|---|---|---|
| 4,759,068 A | * | 7/1988 | Bahl et al. | ...................... 704/242 |
| 4,817,156 A | * | 3/1989 | Bahl et al. | .................. 704/256.2 |
| 4,819,271 A | * | 4/1989 | Bahl et al. | ...................... 704/256 |
| 5,033,087 A | * | 7/1991 | Bahl et al. | .................. 704/256.5 |
| 5,268,990 A | | 12/1993 | Cohen et al. | |
| 5,502,791 A | * | 3/1996 | Nishimura et al. | ........... 704/256 |
| 5,625,749 A | * | 4/1997 | Goldenthal et al. | .......... 704/254 |
| 5,679,001 A | * | 10/1997 | Russell et al. | ................ 434/185 |

(Continued)

OTHER PUBLICATIONS

Niesler, T.R. and P.C. Woodland. "Variable-length category-based n-grams for language modelling", Technical report CUED/F-INFENG/TR.215, Department of Engineering, University of Cambridge, U.K., Apr. 1995.*

(Continued)

*Primary Examiner* — Pierre-Louis Desir
*Assistant Examiner* — David Kovacek
(74) *Attorney, Agent, or Firm* — Fish & Richardson P.C.

(57) ABSTRACT

Methods, systems, and apparatus, including computer programs encoded on a computer storage medium, for training acoustic models. Speech data and data identifying a transcription for the speech data are received. A phonetic representation for the transcription is accessed. Training sequences are identified for a particular phone in the phonetic representation. Each of the training sequences includes a different set of contextual phones surrounding the particular phone. A partitioning key is identified based on a sequence of phones that occurs in each of the training sequences. A processing module to which the identified partitioning key is assigned is selected. Data identifying the training sequences and a portion of the speech data are transmitted to the selected processing module.

21 Claims, 4 Drawing Sheets

(56) References Cited

U.S. PATENT DOCUMENTS

| | | | | |
|---|---|---|---|---|
| 5,729,656 | A * | 3/1998 | Nahamoo et al. | 704/254 |
| 5,758,024 | A * | 5/1998 | Alleva | 704/254 |
| 5,839,105 | A | 11/1998 | Ostendorf et al. | |
| 5,937,384 | A * | 8/1999 | Huang et al. | 704/256 |
| 5,953,701 | A | 9/1999 | Neti et al. | |
| 6,038,533 | A | 3/2000 | Buchsbaum et al. | |
| 6,108,627 | A * | 8/2000 | Sabourin | 704/243 |
| 6,141,641 | A | 10/2000 | Hwang et al. | |
| 6,151,575 | A * | 11/2000 | Newman et al. | 704/260 |
| 6,243,680 | B1 * | 6/2001 | Gupta et al. | 704/260 |
| 6,681,206 | B1 * | 1/2004 | Gorin et al. | 704/243 |
| 7,035,789 | B2 * | 4/2006 | Abrego et al. | 704/9 |
| 7,085,720 | B1 * | 8/2006 | Gorin et al. | 704/257 |
| 7,113,903 | B1 * | 9/2006 | Riccardi et al. | 704/4 |
| 7,310,600 | B1 * | 12/2007 | Garner et al. | 704/234 |
| 7,444,282 | B2 * | 10/2008 | Choo et al. | 704/202 |
| 7,447,635 | B1 | 11/2008 | Konopka et al. | |
| 7,467,087 | B1 | 12/2008 | Gillick et al. | |
| 7,650,331 | B1 | 1/2010 | Dean et al. | |
| 8,620,662 | B2 * | 12/2013 | Bellegarda | 704/260 |
| 2002/0040296 | A1 | 4/2002 | Kienappel | |
| 2002/0087314 | A1 * | 7/2002 | Fischer et al. | 704/255 |
| 2002/0087317 | A1 * | 7/2002 | Lee et al. | 704/257 |
| 2003/0110035 | A1 * | 6/2003 | Thong et al. | 704/254 |
| 2004/0088163 | A1 * | 5/2004 | Schalkwyk | 704/251 |
| 2005/0256715 | A1 * | 11/2005 | Okimoto et al. | 704/257 |
| 2006/0020461 | A1 * | 1/2006 | Ogawa | 704/251 |
| 2006/0031069 | A1 * | 2/2006 | Huang et al. | 704/243 |
| 2006/0116997 | A1 * | 6/2006 | Yu et al. | 707/4 |
| 2008/0262828 | A1 * | 10/2008 | Och et al. | 704/3 |
| 2008/0281857 | A1 * | 11/2008 | Dymetman | 707/102 |
| 2010/0070263 | A1 * | 3/2010 | Goto et al. | 704/8 |
| 2010/0070277 | A1 | 3/2010 | Arakawa et al. | |

OTHER PUBLICATIONS

Brants et al. "Large language models in machine translation," *Proceedings of the 2007 Joint Conference Empirical Methods in Natural Language Processing and Computational Natural Language Learning (EMNLP-CoNLL)*, 2007, 858-867 (10 pages).

Brants et al., "Distributed language models," in *HLT-NAACL (Tutorial Abstracts) '09*, 2009, pp. 3-4 (2 pages).

Chang et al., "Bigtable: A distributed storage system for structured data," *ACM Transactions on Computer Systems (TOCS)*, 2008, 26(2):1-26 (28 pages).

Chelba et al., "Distributed acoustic modeling with back-off n-grams," *Proceedings of ICASSP*, Kyoto, Japan, 2012, 4129-4132 (4 pages).

Chelba et al., "Query language modeling for voice search," in *Spoken Language Technology Workshop (SLT)*, 2010, 127-132 (6 pages).

Coxhead, "A Glossary of Linguistic Terms," University of Birmingham, School of Computer Science www.cs.bham.ac.uk/~pxc/nlpa/nlpgloss.html (accessed Jun. 7, 2012) ,16 pages.

Dean et al., "MapReduce: simplified data processing on large clusters," *Commun. ACM*, 2008, vol. 51, 107-113, (10 pages).

Gales et al., "Progress in the CU-HTK broadcast news transcription system," *Audio, Speech, and Language Processing, IEEE Transactions on*, 2006, 14(5):1513-1525 (16 pages).

Gales, "Semi-tied covariance matrices for hidden markov models," *IEEE Transactions in Speech and Audio Processing*, 1999, 7:272-281 (10 pages).

Halevy et al., "The unreasonable effectiveness of data," *IEEE Intelligent Systems*, 2009, 24(2):8-12 (5 pages).

Kim et al., "Recent advances in broadcast news transcription," *Automatic Speech Recognition and Understanding, ASRU'03. IEEE Workshop on. IEEE*, 2003, pp. 1-6 (8 pages).

Mohri et al., "Weighted finite-state transducers in speech recognition," *Computer Speech & Language*, 2002, 16(1):69-88 (27 pages).

Povey et al., "Boosted MMI for model and feature space discriminative training," in *Proceedings of ICASSP*, 2008, 1-4 (4 pages).

Schwartz et al., "Improved Hidden Markov modeling of phonemes for continuous speech recognition," in *Proceedings of ICASSP*, 1984, 9:21-24 (4 pages).

Vitter, "Random sampling with a reservoir," *ACM Transactions on Mathematical Software (TOMS)*, 1985, 11(1):37-57 ( 21 pages).

Watanabe et al., "Variational bayesian estimation and clustering for speech recognition," *IEEE Transactions on Speech and Audio Processing*, 2004, 12(4):365-381 (17 pages).

Young et al., "The HTK Book," Cambridge University Engineering Department, Cambridge, England, 2002, 384 pages.

Young et al., "Tree-based state tying for high accuracy acoustic modeling," in *Proceedings ARPA Workshop on Human Language Technology*, 1994, 307-312 (6 pages).

Notification of Transmittal of the International Search Report and the Written Opinion of the International Searching Authority, or the Declaration issued in PCT/IS2012/045039 on Dec. 18, 2012, 11 pages.

Rybach, David et al, "Advances in Arabic Broadcast News Transcription at RWTH", Automatic Speech Recognition & Understanding, 2007. ASRU. IEEE Works HOP on, IEEE, PI, Dec. 1, 2007, pp. 449-454.

Popescu, Vladimir et al, "Parallel training algorithms for continuous speech recognition, implemented in a message passing framework", 14th European Signal Processing Conference (EUSIPCO 2006), Sep. 8, 2006, pp. 1-5, Florence, Italy, Retrieved from the Internet on Dec. 7, 2012: URL:http://www.eurasip.org/Proceedings/Eusipco/Eusipco2006/papers/1568981978.pdf, 4 pages.

Opsasnick, Michael N., Non-final Office Action in U.S. Appl. No. 13/539,284, Sep. 11, 2012, 10 pages.

Authorized Officer Athina Nickitas-Etienne, International Preliminary Report on Patentability for PCT Application PCT/US2012/045039, dated Jan. 16, 2014, 6 pages.

"Vector Quantization" Data-Compression.com, a website devoted to the principles and practice of data compression, 6 pages, http://www.data-compression.com/vq.html (accessed Aug. 2012).

Banjeree, Pratyush et al., "Application of Triphone Clustering in Acoustic Modeling for Continuous Speech Recognition in Bengali," 19th International Conference on Pattern Recognition, 2008. (ICPR 2008), 4 pages.

Gauvain, J.L. et al., "Developments in Continuous Speech Dictation using the ARPA WSJ Task," Proc. IEEE ICASSP-95, 1995, 4 pages, ftp://192.44.78.170/public/ica95lv.pdf.

Novotney, Scott et al., "Unsupervised Acoustic and Language Model Training With Small Amounts of Labelled Data," IEEE International Conference on Acoustics, Speech and Signal Processing, 2009 (ICASSP 2009.), 4 pages http://old-site.clsp.jhu.edu/people/snovotne/papers/novotney_icassp09.pdf.

Reynolds, D. A., "Gaussian Mixture Models, Encyclopedia of Biometric Recognition," Springer (2008). 5 pages http://www.ll.mit.edu/mission/communications/ist/publications/0802_Reynolds_Biometrics-GMM.pdf.

Zweig, Geoffrey et al., "Continuous Speech Recognition with a TF-IDF Acoustic Model," Interspeech 2010, 4 pages, http://research.microsoft.com/pubs/131332/tfidf_am.pdf.

Opsasnick, Michael N., Notice of Allowance in U.S. Appl. No. 13/539,284, May 17, 2013, 24 pages.

* cited by examiner

TRAINING ACOUSTIC MODELS USING DISTRIBUTED COMPUTING TECHNIQUES

CROSS-REFERENCE TO RELATED APPLICATIONS

This application claims the benefit of U.S. patent application Ser. No. 61/503,334, filed on Jun. 30, 2011, and of U.S. patent application Ser. No. 61/608,753, filed on Mar. 9, 2012. The contents of both applications are incorporated herein by reference in their entirety.

BACKGROUND

Speech recognition systems use acoustic models to transcribe utterances. Acoustic models are often trained using a set of training data that include recorded utterances. Typically, acoustic models include statistical data about the sounds that make up utterances in the training data.

SUMMARY

Distributed computing techniques can be used to train an acoustic model. The data used to train the acoustic model can include sequences of phonetic elements that each represent different phonetic contexts. Data identifying the sequences can be distributed to multiple processing modules that are each assigned to train a different portion of the acoustic model. To facilitate training of the acoustic model, data for sequences that include a common sequence of phonetic elements can be transmitted to the same processing module, permitting the processing module to efficiently train the assigned portion of the acoustic model.

One innovative aspect of the subject matter described in this specification is embodied in methods that include the actions of: receiving speech data and a transcription for the speech data; accessing a phonetic representation for the transcription; extracting training sequences from the phonetic representation for a particular phone in the phonetic representation, each of the training sequences including a different set of contextual phones surrounding the particular phone; identifying a partitioning key based on a sequence of phones that occurs in each of the training sequences; selecting, from among a plurality of processing modules, a processing module to which the identified partitioning key is assigned, the processing module being designated to train a portion of an acoustic model that corresponds to the identified partitioning key; and transmitting, to the selected processing module, (i) data identifying the training sequences and (ii) a portion of the speech data that corresponds to the training sequence that includes the most contextual phones.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. For instance, accessing the phonetic representation for the transcription includes accessing a phonetic representation including context-independent phones. Receiving speech data includes receiving feature vectors that indicate speech characteristics. Transmitting at least a portion of the speech data includes transmitting a speech data instance for fewer than all of the training sequences in the set of training sequences. Transmitting the at least a portion of the speech data includes transmitting the speech data corresponding to the training sequence that includes the most contextual phones, without transmitting additional speech data for the other training sequences to the selected processing module. Receiving, at the selected processing module, the data identifying the training sequences and the portion of the speech data that corresponds to the training sequence that includes the most contextual phones. Accessing, at the selected processing module, a different subset of the received speech data for each of the training sequences. Identifying the partitioning key based on the sequence of phones that occurs in each of the training sequences includes identifying the partitioning key based on a sequence of two or more consecutive phones that occurs in each of the training sequences. Identifying the partitioning key based on the sequence of phones that occurs in each of the training sequences includes identifying the partitioning key based on a sequence that includes one contextual phone before the particular phone and one contextual phone after the particular phone. Identifying the partitioning key based on the sequence of phones that occurs in each of the training sequences includes identifying a partitioning key for each of the training sequences, where the same partitioning key is identified for each of the training sequences.

These and other embodiments may each optionally include one or more of the following features. For instance, the training sequences are first training sequences that each include a central triphone. Identifying the partitioning key based on the sequence of phones that occurs in each of the training sequences includes identifying the partitioning key based on the central triphone included in the first training sequences. Transmitting, to the processing module and not to any of the other processing modules in the plurality of processing modules, data identifying second training sequences including the same central triphone included in the first training sequences, the second training sequences being extracted from a phonetic representation for a transcription for second speech data. Extracting the training sequences for the particular phone in the phonetic representation includes identifying at least a first sequence that includes one contextual phone before the particular phone or one contextual phone after the particular phone, a second sequence that includes two contextual phones before the particular phone or two contextual phones after the particular phone, and a third sequence that includes three contextual phones before the particular phone or three contextual phones after the particular phone. Extracting the training sequences for the particular phone in the phonetic representation includes extracting sequences of consecutive phones in the phonetic representation.

These and other embodiments may each optionally include one or more of the following features. For instance, receiving, at the selected processing module, the data identifying the training sequences. Aggregating, at the selected processing module, the portion of the speech data with speech data for other instances of the training sequences. Generating, at the selected processing module, a model for a first training sequence of the training sequences based on the aggregated speech data for first the training sequence. Storing the generated model in a distributed associative array, the generated model being stored in a partition of the distributed associative array being associated with the identified partitioning key. Generating the model for the first training sequence includes generating a context-dependent Gaussian mixture model dependent on the sequence of contextual phones included in the first training sequence, the Gaussian mixture model representing the output distribution of a hidden Markov model state of a central phone of the first training sequence. Storing the generated model in the distributed associative array includes storing the generated model in the distributed associative array such that the generated model is associated with a key that uniquely corresponds to the first training sequence. Determining, at the selected processing module, that the aggregated speech data includes data for fewer than a threshold number of instances of a second training sequence of the training sequences, and in response to determining that the aggregated speech data includes data for fewer than the threshold number of instances of the second training sequence, not generating a model for the second training sequence.

Advantageous implementations can include one or more of the following features. An acoustic model that recognizes phonetic contexts of many varying sizes can be trained. The training process for the acoustic model can use large amounts of input data. The accuracy of an acoustic model can be enhanced.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
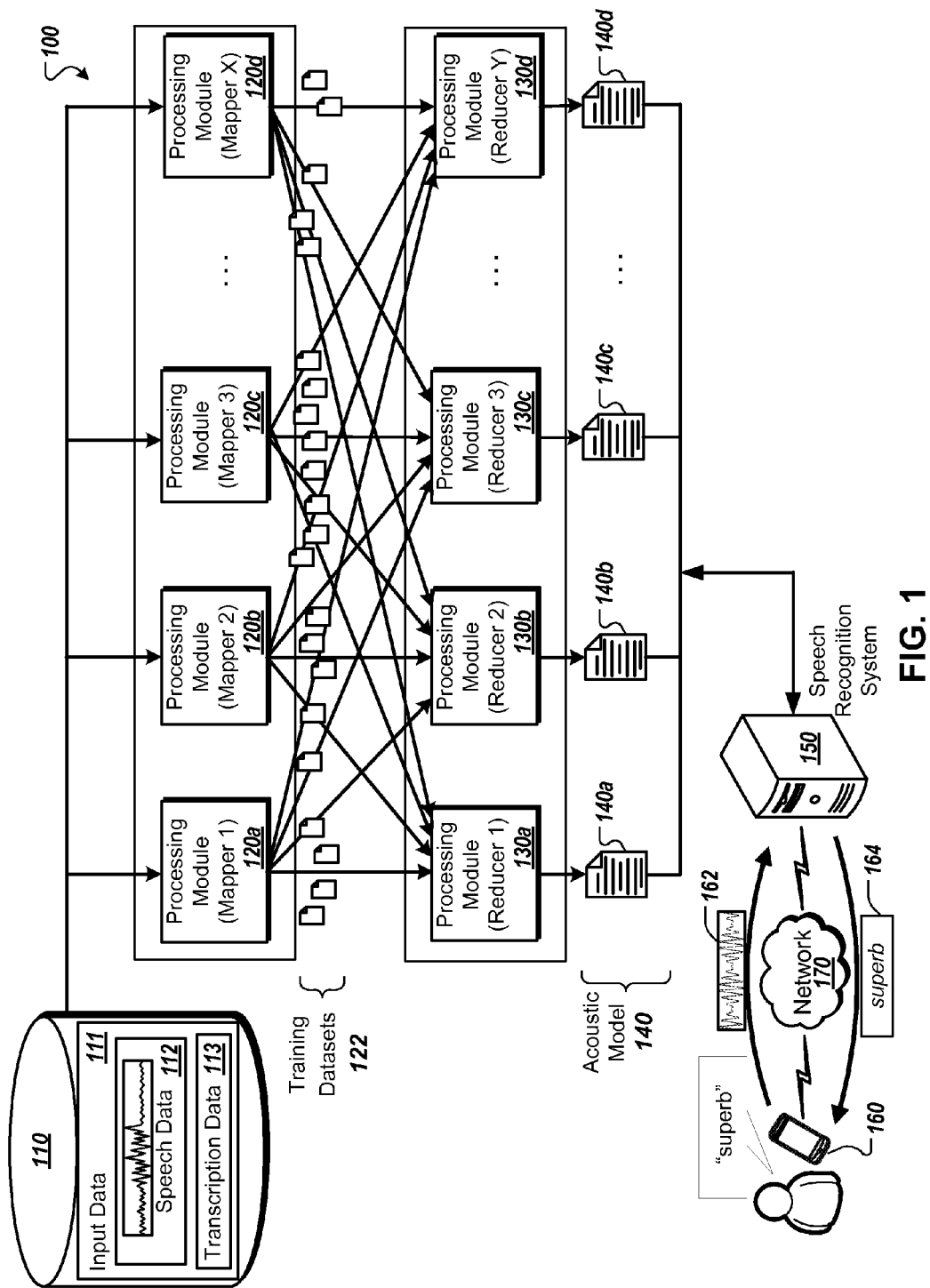
FIG. 1 is a diagram that illustrates an example of a system for training an acoustic model.

An acoustic model can be used to assign a score to an acoustic frame using sub-word modeling units (e.g., phones) that are context dependent. The scores produced by the acoustic model can be used to identify a transcription for a set of acoustic frames, or to evaluate the likelihood that a particular transcription is correct. In some implementations, the sub-word modeling units, or phones, are each modeled by a Hidden Markov model (HMM), typically having three states. Each state can assign a likelihood score to one or more multi-dimensional acoustic frames using a Gaussian Mixture Model (GMM). Typically, each mixture component of a GMM uses a diagonal covariance matrix.

As described further below, an acoustic model can be trained using a variety of phonetic contexts of differing lengths. For example, the acoustic model can be trained with training sequences that respectively include one, two, three, or more phones before and/or after a central phone.

Many typical acoustic models are trained using use between 100 and 1000 hours of training data. Typical training processes are often unable to make advantageous use of more than 1000 hours of training data. In addition, the computational expense of processing a larger amount of training data is impractical for many training methods. However, using the techniques described below, an acoustic model can be trained using several thousand hours of training data, tens of thousands of hours of training data, a hundred thousand hours of training data, or more. The distributed computing framework described below can facilitate the processing required to use large training data sets.

Additionally, typical acoustic models generally include fewer than one million Gaussians. In some implementations, an acoustic model trained as described below can include more than one million Gaussians, or more than ten million Gaussians, as components of various GMMs. These Gaussians can be used to model context-dependent HMM states for a large number of contexts, thus making advantageous use of the large variety of contexts presented in a large sets of training data. The acoustic model includes GMMs for many different variations of contexts, including contexts of different lengths. As a result, the techniques described below can provide acoustic models that include context-dependent GMMs for larger and more varied amounts of context than is stored in typical acoustic models. In some instances, the larger and more varied sets of context-dependent GMMs in the acoustic models described below can result in higher speech recognition accuracy than is achieved using typical acoustic models.

Distributed computing techniques can be used to train the acoustic model (e.g., to update an existing acoustic model or create a new acoustic model). In a distributed computing system, different processing modules are assigned to train different portions of the acoustic model. Each of the processing modules is assigned one or more partitioning keys that correspond to the portion of the acoustic model to be trained.

In the distributed system, speech data and a transcription for the speech data can be received. A phonetic representation for the transcription can be accessed, and training sequences can be extracted from the phonetic representation. The training sequences can include sequences that include a different set of contextual phones surrounding a particular phone in the phonetic representation. A partitioning key is identified based on a sequence of phones that occurs in each of the training sequences, such as a central sequence of three phones that occurs in each training sequence. Based on the partitioning key, a processing module is selected from a plurality of processing modules. Data identifying the training sequences and data identifying a portion of the speech data are transmitted to the selected processing module. The selected processing module can use the received data to train (e.g., update or generate) a portion of the acoustic model that is associated with the partitioning key.

FIG. 1 is a diagram that illustrates an example of a system 100 for training an acoustic model. The system 100 includes a number of processing modules, some of which are referred to as mappers 120a-120d and others referred to as reducers 130a-130d. The mappers 120a-120d access input data from one or more data storage devices 110, and generate related key-value pairs, which are illustrated as training datasets 122. The reducers 130a-130d each receive different subsets of the key-value pairs, and use the received data to generate or update an acoustic model 140. After training, the acoustic model 140 can be used by a speech recognition system 150 to generate transcriptions for speech. For example, the speech recognition system 150 can receive speech data from, and provide transcriptions to, a computing device 160 over a network 170.

The computing device 160 can be, for example, a desktop computer, a laptop computer, a cellular phone, a smartphone, a personal digital assistant (PDA), a tablet computer, a wearable computer, a navigation system, or another computing device. The operations performed by the speech recognition system 150 can be performed by individual computer systems or can be distributed across multiple computer systems. The speech recognition system accesses the acoustic model 140, stored on one or more data storage devices, which can be connected directly or over the network 170. The network 170 can be wired or wireless or a combination of both. The network 170 can include one or more public or private networks, and can include the Internet.

The processing modules in the system 100 can use the MapReduce process to perform the distributed training of the acoustic model 140. In this process, the mappers 120a-120d each perform map operations on different sets of input data, producing key-value pairs as map output. The key-value pairs are sent to the reducers 130a-130d, which combine values associated with the same key to produce a final output value for each key. Each reducer 130a-130d may be responsible for a different non-overlapping subset of the overall set of keys. In other words, each key may be assigned to a single reducer 130a-130d, so that data associated with the same key is processed by the same reducer 130a-130d. The distribution of data from the mappers 120a-120d to the reducers 130a-130d may be referred to as shuffling, and may result in each reducer receiving, from each mapper, the key-value pairs for which the reducer is responsible.

In further detail, the input data 111 used to train the acoustic model 140 includes speech data 112 and transcription data 113. The speech data 112 can include recorded audio that include utterances and/or data describing utterances, such as feature vectors that describe speech characteristics. In some implementations, hundreds, thousands, or tens of thousands of hours of speech samples are used to train the acoustic model 140. The transcription data 113 can include transcriptions for the utterances included in the speech data 112. In some implementations, the speech data 112 and the corresponding transcription data 113 used to train the acoustic model 140 are selected so that the transcriptions have at least a minimum confidence level. For example, a speech sample can be selected for use in training when a confidence score for the corresponding transcription indicates that a speech recognizer has at least a minimum confidence (e.g., 70%, 80%, or 90%) in the transcription.

Different portions of the input data 111 are processed by different mappers 120a-120d. In some implementations, input data 111 can be organized into portions or "chunks" of data, and each mapper 120a-120d processes different portions of the input data 111. In some implementations, the system 100 can include one or more master processing modules (not shown) which assign and/or track the portions of the input data 111 that are processed by each mapper 120a-120d.

Based on the input data 111, the mappers 120a-120d generate key-value pairs as mapper outputs, where each key-value pair identifies a training sequence for training the acoustic model 140. Groups of related key-value pairs are illustrated as datasets 122. Nevertheless, each key-value pair can be transmitted independently to a reducer 130a-130d. A dataset 122 can include, for example, key-value pairs that each identify a training sequence with different amount of phonetic context around a particular phone in a particular instance of an utterance. The key-value pairs in each dataset 122 identify related training sequences that have particular characteristics in common, such as a central sequence of phones that occurs in each of the related training sequences.

The mappers 120a-120d output the key-value pairs in the datasets 122, and the key-value pairs are distributed to the various reducers 140a-140b in a shuffling phase. As described further below, the partitioning keys used for shuffling are defined so that each key-value pair in a given dataset 122 is transmitted to the same reducer 130a-130d. For example, the partitioning key associated with a training sequence can be based on a central sequence of phones in the training sequence. Because each related training sequence has the same central sequence, each key-value pair is associated with the same partitioning key, and is thus assigned to the same reducer 130a-130d (e.g., the reducer assigned to handle data associated with that partitioning key).

Each reducer 130a-130d is assigned one or more partitioning keys, and receives all of the key-value pairs associated with its assigned one or more partitioning keys. In some implementations, each partitioning key is assigned to exactly one reducer 130a-130d, so that the key-value pairs in each dataset 122 are transmitted to, and processed by, a single reducer 130a-130d. Each reducer 130a-130d is responsible for generating a particular partition 140a-140d of the acoustic model 140 that corresponds to its assigned one or more partitioning keys. Based on the key-value pairs that each reducer 130a-130d receives, each reducer 130a-130d aggregates training sequences and trains the assigned partition 140a-140d of the acoustic model 140 (e.g., by statistical analysis of the aggregated data for each assigned partitioning key). The acoustic model partitions 140a-140d, which store the reducer outputs, can be segments of a distributed (e.g., partitioned) associative array.

After training of the acoustic model 140, the speech recognition system 150 can access data in the acoustic model 140 using the same partitioning keys used to train the acoustic model 140. When audio data 162 is received from a computing device 160, the speech recognition system 150 can evaluate candidate transcriptions (e.g. hypotheses) for the audio data 162 using the acoustic model 140. For a given candidate transcription, a set of partitioning keys can be selected based on the phonetic characteristics of the candidate transcription. Acoustic model data that is associated with the selected partitioning keys is then retrieved from the associative array. Data for each partitioning key can be obtained from the partition 140a-140d that was trained by the reducer 130a-130d assigned that partitioning key during training of the acoustic model 140. The speech recognizer system 150 uses the acoustic model data to assess the likelihood that the candidate transcription is correct. The speech recognizer system 150 then provides to the computing device 160 one or more hypotheses 164 determined most likely to be correct transcriptions of the audio data 162.

Figure 2:
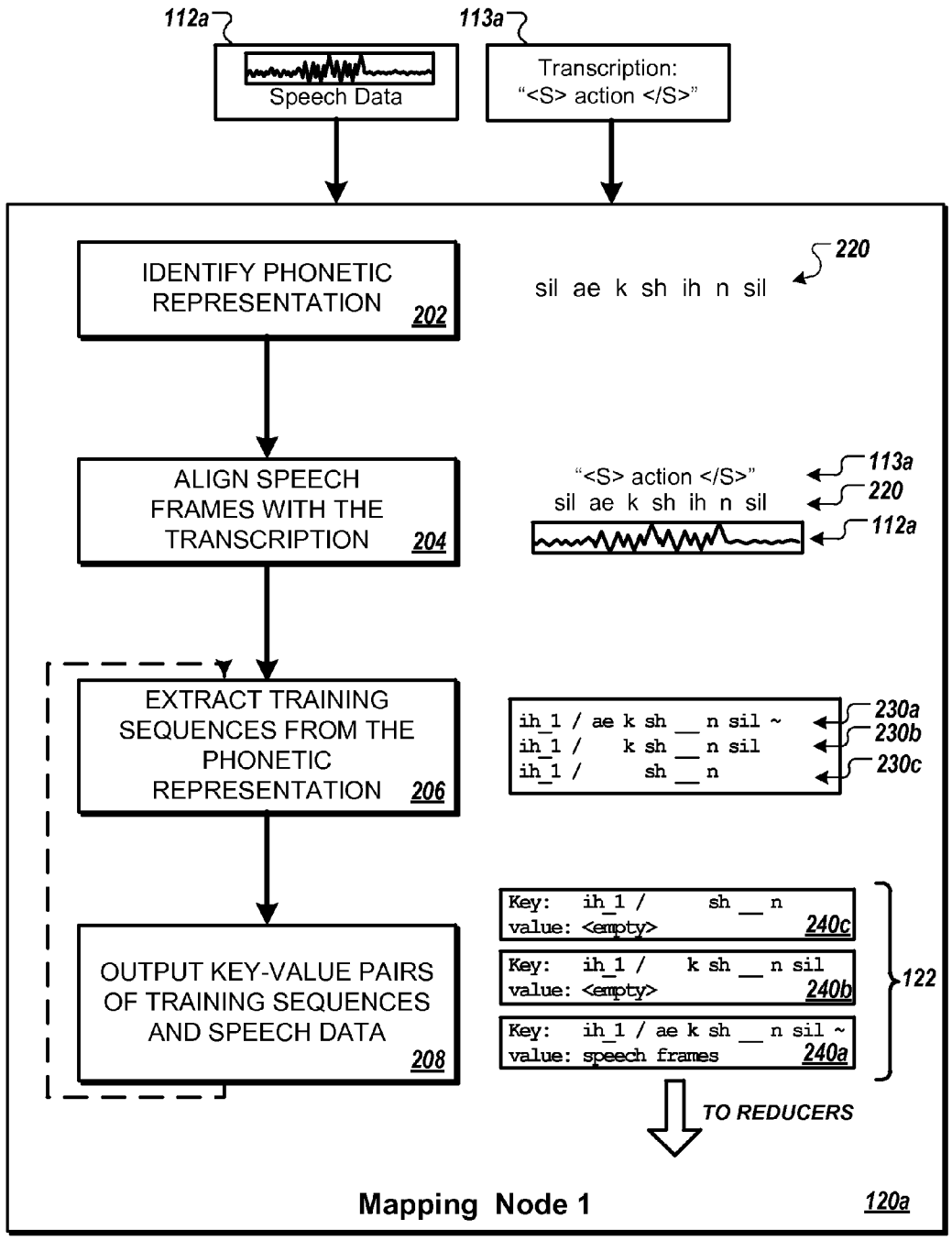
FIG. 2 is a diagram illustrating an example of processing performed by a mapper processing module.

FIG. 2 is a schematic diagram illustrating an example of processing performed by a mapper processing module. As an example, the mapper 120a of FIG. 1 is illustrated processing a particular input to generate one of the training datasets 122. Each of the mappers 120a-120d can perform similar processing with other input data to generate other datasets 122. Each mapper 120a-120d can perform processing on word-level segments of sample speech data, in the manner described below.

The mapper 120a of FIG. 1 accesses speech data 112a for particular utterance, such as a voice query submitted by a user. The mapper 120a also accesses data that identifies a transcription 113a for the speech data 112a, which in the illustrated example, indicates that the transcription 113a includes the term "action." In some implementations, the mapper 120a receives chunks of input data that each include multiple records. Each record can include the audio waveform for the utterance, the word-level transcription for the utterance, and other elements.

In some implementations, to avoid training the acoustic model 140 with erroneous data, the mapper 120a ensures that a minimum threshold confidence score for the transcription is met, which indicates that the transcription is likely to be correct. When a transcription does not meet the minimum confidence threshold, the transcription and associated data are not processed further, and the mapper proceeds to process other input data.

The mapper 120a identifies a phonetic representation 220 for the transcription 113a (202). From a pronunciation lexicon, the mapper 120 can obtain a mapping of the transcription 113a to a sequence of phonetic elements, such as context-independent (CI) phones, that represent a pronunciation of the transcription 113a. For example, for the word "<S>action</S>," the phonetic representation 220 "sil ae k sh ih n sil" is obtained. The symbols "<S>" and "</S>" denote sentence boundaries, which are pronounced as long silences, indicated as "sil" in the phonetic representation 220. In some implementations, the Cl-phones can be augmented with word boundary symbols, which occupy their own positions in phonetic representations.

The mapper 120a aligns the phonetic representation 220 with the transcription 113a (204). For example, the mapper 120a generates context-dependent-state level Viterbi alignment between speech frames of the speech data 112a and the transcription 113a. The alignment can be obtained using H ∘C ∘L, where L, C, and H respectively denote the pronunciation lexicon, a context dependency tree, and HMM-to-state finite state transducers (FSTs). In some implementations, alignment involves identifying the speech frames that correspond to each context-dependent HMM state in the phonetic representation, where the context is the current phone and surrounding phones. Alignment can include determining the beginning and ending time indexes of audio data correspond to each HMM state of each phone.

The mapper 120a extracts training sequences 230a-230c from the phonetic representation 220 (206). Each training sequence 230a-230c is referred to as an M-phone, a modeling unit that identifies a sequence of phones. M denotes an integer number of contextual phones surrounding a central phone in the sequence. Each training sequence 230a-230c or M-phone describes a different contiguous segment of acoustic features corresponding to a context-dependent HMM state. Each training sequence 230a-230c can include different set of contextual phones from a contiguous portion of the phonetic representation 220.

M-phones having different values of M include different numbers of contextual phones extending to the left and right of a central phone from the phonetic representation 220. As an example, a $5^{th}$-order M-phone (e.g., a 5-phone) includes 5 phones preceding a central phone and 5 phones following the central phone, thus describing a sequence of 11 consecutive phones in the phonetic representation 220. As another example, a $3^{rd}$-order M-phone (e.g., a 3-phone) includes 3 phones preceding a central phone and 3 phones following the central phone, therefore describing a sequence of 7 phones. A $1^{st}$-order M-phone (or 1-phone) includes a total of three phones, and is therefore referred to as a "triphone" (which is different from a 3-phone, which is 7 phones in length). M-phones can be extracted for any integer value of M when the phonetic representation 220 is sufficiently long.

To extract a set of training sequences 230a-230c, the mapper 120a selects a central phone, which represents a central position that each training sequence 230a-230c is centered on. For the central phone, the mapper 120a extracts M-phones for values of M that range from 1 to a predetermined maximum value. The maximum value identifies the highest-order M-phone to be extracted. The maximum value of M can be, for example, 3, 4, 5, or 7, or another value of M. In some implementations, the maximum value of M can be consistent for all mappers 120a-120d and for all input data when generating the acoustic model 140.

The mapper 120a extracts the M-phone for the maximum value of M, and the mapper 120a also extracts "back-off" M-phones that each include fewer contextual phones. From the maximal order M-phone (e.g. the M-phone that includes the largest number of contextual phones), the mapper 120a extracts M-phones with lower values of M, until the $1^{st}$-order M-phone (the triphone) is extracted. For example, if the maximum value of M is 5, the back-off M-phones are the 4-phone, 3-phone, 2-phone, and 1-phone.

In the illustrated example, each training sequence 230a-230c is a different M-phone centered on the same central phone "ih." The mapper 120a uses "3" as a maximum value of M, indicating that a maximum of 3 contextual phones before and after the central phone, "ih," are to be used in generating the acoustic model 140. A total of 3 M-phones are extracted (e.g., M-phones for the set M={1, 2, 3}). The maximal order M-phone in the set—the M-phone that includes the most phones—is the training sequence 230a, the 3-phone. The training sequence 230b (the 2-phone) and the training sequence 230c (the 1-phone) are the back off M-phones in the set. Each training sequence 230a-230c includes a shared segment of the phonetic representation 230, the portion "sh_n," where "_" is a placeholder marking the position where the central phone "ih" is located. Each training sequence 230a-230c is a training data instance that corresponds to a portion of the speech data 112a, as described further below. A representation that uniquely identifies an M-phone is referred to as an M-phone key. The M-phone key can be a string representation of the training sequence 230a-230c or another format that identifies the training sequences 230a-230c.

In some implementations, multiple states or units are used to model each phone. For example, a phone can be modeled by three states in an HMM. The phone "ih" can be modeled by states "ih_1," "ih_2," and "ih_3," which represent characteristics of the beginning, middle, and end of the "ih" phone, respectively. Thus the training sequences can be used to model particular states within a phone, rather than the entire phone. While a set of training sequences 230a-230c corresponding to only the state "ih_1" is illustrated, the mapper 120a can extract similar sets of training sequences can be extracted for other states of the "ih" phone, and for states of other phones in the phonetic representation 220.

In some instances, the amount of phonetic context that surrounds a central phone may not be symmetrical. In such instances, the M-phones that are extracted may include asymmetrical amounts of context. For example, for the phonetic representation 220, there are 4 contextual phones before the phone "ih" and 2 contextual phones after the phone "ih." As a result, the training sequence 230a has a different number of contextual phones before and after the phone "ih," and represents a sequence of six phones rather than a sequence of 7 phones, which would be expected for a 3-phone. To extract training sequences, the mapper 120a can extract asymmetrical back-off M-phones by backing-off from only the longer end of an asymmetrical phonetic representation. When a symmetric amount of context is reached, the mapper 120a can proceed with symmetric back-offs. A symbol, such as "~" can be used in an asymmetrical M-phone to indicate a vacant contextual position for which no contextual phone is available.

The mapper 120a outputs key-value pairs 240a-240c that each identify one of the training sequences 230a-230c, and may include speech data (208). A key-value pair 240a-240c is generated and output for each of the training sequences 230a-230c. The training sequences 230a-230c (or other encoded representation of them) serve as the keys in the key-value pairs 240a-240c. The values in the key-value pairs 240a-240c can be speech frames or other speech data, although the value may also be empty.

In some implementations, speech frames are only included in the key-value pair 240a for the training sequence 230a that includes the highest number of phones (e.g., the maximal order M-phone). To avoid sending an excessive amounts of data to the reducer, speech frames for the back-off M-phones are not included in the key-value pairs 240b, 240c. As a result, the data in the dataset 122 can include: (i) a key-value pair of <M-phone key, speech frames>, for the longest training sequence; and (ii) a key-value pair of <M-phone key, <empty>> for each of the back-off M-phones.

Although speech frames are not provided for individual back-off M-phones, the corresponding speech frames can be accessed as subsets of the speech frames provided for the maximal order M-phone. If speech frames were transmitted with each key-value pair 240a-240c, the speech frames would be replicated and transmitted M times, substantially increasing the bandwidth requirements for the system. By transmitting the speech frames with only one of the key-value pairs 240a-240c, and caching the speech frames at the reducer, the bandwidth requirements are reduced.

Various techniques can ensure that the reducer can access speech frames for each training sequence 230a-230c. During shuffling, each key-value pair 240a-240c is transmitted to the same reducer 130a-130d for processing. Each key-value pair 240a-240c is routed to the appropriate reducer 130a-130d (by the mapper 120a and/or other processing modules) based on a partitioning key. As discussed above, data associated with a given partitioning key can be processed by exactly one reducer 130a-130d. The partitioning key is a function of the central triphone, which is shared by each training sequence 230a-230c. Because each of the training sequences 230a-230c has the same central triphone, "sh ih n," the key-value pair 240a-240c for each training sequence 230a-230c is assigned the same partitioning key, and is thus received by the same reducer 130a-130c. All key-value pairs that include the same central triphone (e.g., "sh ih n") are handled by the same reducer 130a-130d, regardless of which mapper 120a-120d produced the key-value pair.

In the illustrated example, the partitioning key is a function of the central triphone. As an alternative, in some implementations, another partitioning key system is used. For example, the partitioning key can be determined based on the central phone, or based on a 2-phone, resulting in a different division of work among the reducers 130a-130d.

Because only one key-value pair 240a in the dataset 122 includes speech frames, the reducer that receives the key-value pairs 240a-240c caches the speech frames. As described further below, the reducer processes the key-value pairs 240a-240c in order from longest training sequence to shortest training sequence. Thus the key-value pair for any given M-phone is processed by the reducer before the key-value pairs for any of its back-off M-phones. The reducer can cache the speech frames for all of the back-off M-phones down to the central triphone.

In some implementations, to facilitate the ordering of the training sequences and caching of speech frames, each training sequence can be re-keyed before being output to the reducer. For example, the training sequence 230a, "ih_1/ae k sh_n sil ~" can be keyed as "ih_1/sh n k sil ae ~" to guarantee that data for the same central triphone is processed in order of longest context to shortest context at the reducer processing "partition (ih_1/sh_n)."

In addition to outputting the dataset 122 for "ih_1" (the first state of the phone "ih"), the mapper 120a can also extract training sequences and output key-value pairs that identify training sequences for "ih_2" and "ih_3," which are other states of the phone "ih." The mapper 120 can also generate datasets 122 with other phones in the phonetic representation 220 as the central phone. For example, datasets 122 can be generated with "ae," "k," "sh," and so on as central phones, respectively. In some implementations, the mapper 120a generates a dataset 122 for each state of each phone in the phonetic representation 220. The mapper 120a then proceeds to repeat the described operations for additional input data.

Figure 3:
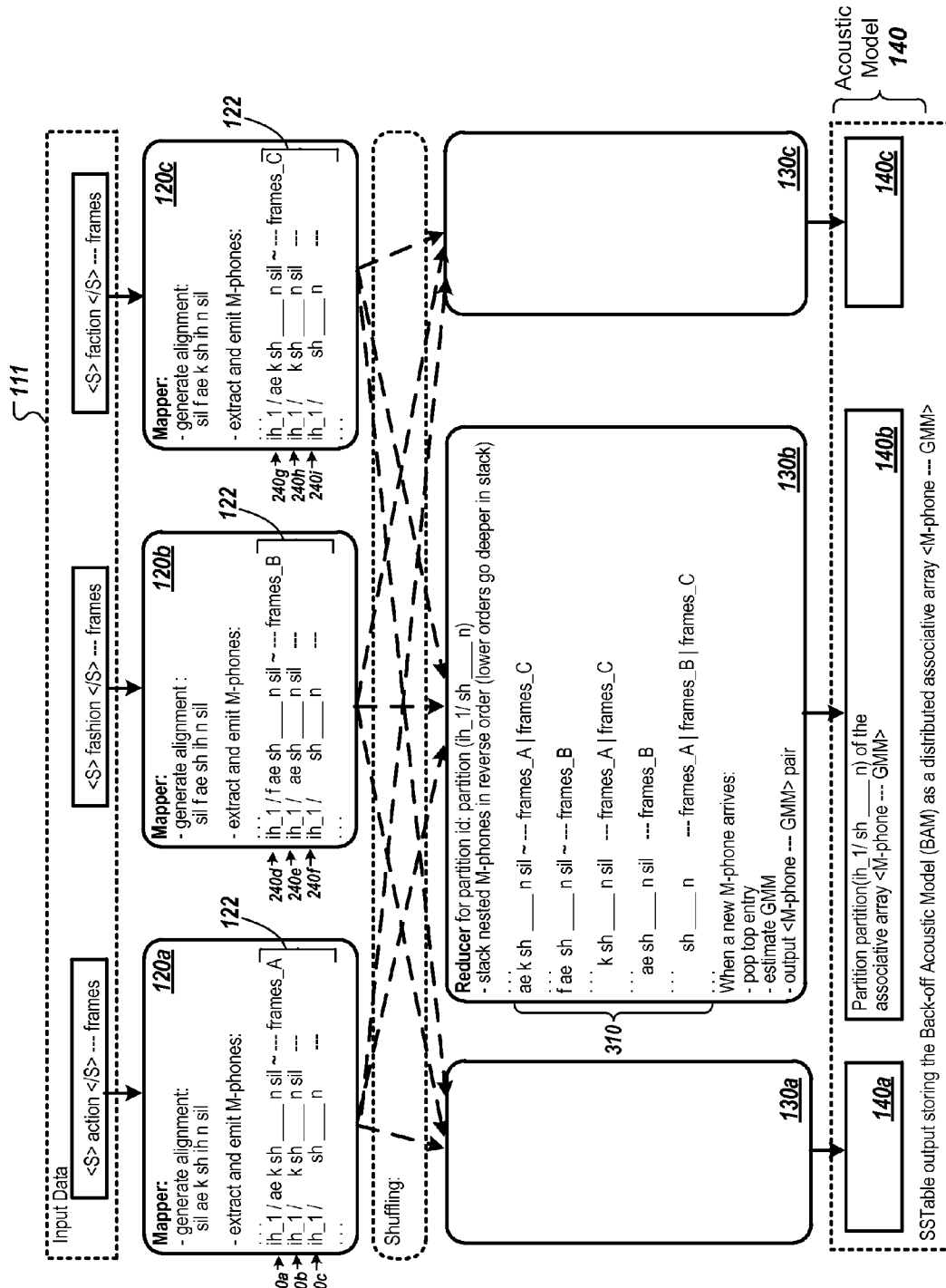
FIG. 3 is a diagram illustrating an example of interactions between mapper processing modules and reducer processing modules of FIG. 1.

FIG. 3 is a diagram illustrating an example of interactions between mapper processing modules 520a-520d and reducer processing modules 530a-530d of FIG. 1. The diagram also illustrates processing performed by the reducer processing modules in further detail. In the illustrated example, three mappers 120a-120c generate key-value pairs 240a-240i based on speech inputs "<S> action <S>," "<S> fashion <S>," and "<S> faction <S>," respectively. For purposes of example, the key-value pairs 240a-240i illustrated each identify a training sequence (e.g., an M-phone) centered on the same central phone, "ih_1." Each of the training sequences also includes the same central triphone sequence, identified by the M-phone key of "ih_1/sh_n."

The output of the mappers 120a-120c is distributed to the reducers 130a-130c during the shuffling phase of processing. Each of reducers 130a-130c is assigned a distinct set of partitioning keys. During shuffling, each reducer 130a-130c receives all of the training sequences with its set of partitioning keys. As described above, the partitioning key for a training sequence is determined using the central triphone within the training sequence. Because the training sequences all include the same central triphone, the training sequences are all transmitted to the same reducer.

In the illustrated example, the partitioning key "ih_1/sh_n" is assigned to the reducer 130b. All of the training sequences include the same central triphone, and therefore are associated with the same partitioning key "ih_1/sh_n." As a result, all of the training sequences are transmitted to the same reducer 130b during shuffling.

During shuffling, the key-value pairs identifying the training sequences can be transmitted to the reducers directly or indirectly through one or more other devices. In some implementations, a mapper may determine that a particular reducer, from a set of reducers, is assigned to process each training sequence. For example, the mapper or another processing device may access a table to determine which reducer is assigned to the partitioning key associated with a given key-value pair. Other methods of routing the key-value pairs to the appropriate reducers can be used.

In some implementations, one or more shuffler processing modules sort the stream of key-value pairs 240a-240i output by the mappers so that the key-value pairs 240a-240i arrive the reducers in a particular order, for example, in order from longest training sequence to shortest training sequence. For example, the key-value stream that arrives at a reducer can sorted so that the key-value pairs arrive at the reducer sorted in lexicographic order of the keys (e.g., the M-phone training sequences). The re-keying of the training sequences, described above, can facilitate this sorting, so that standard string sorting can be used to obtain the appropriate ordering. By sorting the key-value pairs 240a-240c in this manner, it can be guaranteed that the reducer processes the key-value pair for a maximal order M-phone, which includes speech frames, before processing the key-value pairs for the back-off M-phones, which do not include speech frames.

Each key-value pair can be independently directed to the appropriate reducer. For example, the partitioning key associated with a key-value pair can be identified from the key portion of the key-value pair, which identifies a particular training sequence or M-phone. A sequence from the key portion, such as the central triphone, can be used to determine the appropriate partitioning key for that key-value pair.

Reducers aggregate the data in the key-value pairs. In the illustrated example, the reducer 130b aggregates the data in the received key-value pairs 240a-240i, where each represents one instance of a training sequence. The reducer 130b can aggregate the data by adding training sequences to a stack 310. In the stack 310, the training sequences are positioned according to their length. For example, shorter training sequences, such as "sh_n," are placed lower in the stack than longer sequences, such as "ae k sh_n ~."

When the reducer 130b receives a key-value pair for a maximal order M-phone (e.g., key-value pair 240a that includes speech frames), the reducer places it at the top of the stack 310. The key-value pairs for the back-off M-phones (e.g., the key value pairs 240b, 240c that do not include speech frames) arrive afterward, while the key-value pair for the maximal order M-phone is at the top of the stack 310. The back-off M-phones are placed below the maximal order M-phone in the stack 310, and reference the speech frames provided for the maximal order M-phone. As a result, the back-off M-phones are associated with corresponding speech frames in the stack 310, even though speech frames were not provided with the back-off M-phones individually.

Each entry in the stack 310 can represent a unique training sequence or phonetic context. In other words, data for different instances of the same training sequence can be accumulated and stored in a single entry in the stack 310. As the reducer 130a accumulates data from the mappers 120a-120d, multiple key-value pairs are received for the sequences of phones. In other words, data is received that represents instances of the same phonetic context occurring in different speech samples. As an example, the reducer 130b receives three key-value pairs 240c, 240f, 240i that identify the same training sequence, "sh_n." Each key-value pairs 240c, 240f, 240i, or instance of the training sequence "sh_n," corresponds to different speech frames, being subsets of the speech frames "frames_A," "frames_B," and "frames_C," respectively.

After shuffling, and after the data from the key-value pairs 240a-240i is aggregated in the stack 310, the reducer 130b uses the aggregate data to generate portions of the acoustic model 140. The reducer 130b removes the top entry from the stack, and estimates a Gaussian Mixture Model (GMM) (e.g., a linear combination of Gaussians) for the training sequence using the speech frames corresponding to the training sequence. The GMMs produced can be context-dependent, state-specific GMMs. For example, the GMM generated using a given sequence can model the output distribution of a particular HMM state of the central phone of the training sequence. The GMM is dependent on the phonetic context (e.g., the sequence of contextual phones) in the training sequence, as the GMM is generated based on speech frames that each correspond to that phonetic context.

The output of the reducer 130b can be in the form of an array entry, <M-phone, GMM>, which can be stored in a distributed associative array. The reducer 130b then removes the next entry from the top of the stack 310, and estimates a GMM for the training sequence that this entry represents. The reducer 130b continues to generate acoustic model data based on each of the entries in the stack 310, with each entry representing a different phonetic context. The pairs of training sequences and GMMs are written to the distributed associative array. In some implementations, the distributed associative array is an immutable persistent B-tree, such as an SSTable.

As described above, each phone can be represented by multiple HMM states (e.g., "ih" can be represented by HMM states "ih_1," "ih_2," and "ih_3,"). In some implementations, each GMM stored in the acoustic model 140 can model the output distribution of a particular HMM state of a particular phone. The GMMs are conditioned on the identity of the HMM state (e.g., "ih_1") and also on the surrounding phonetic context (e.g., the contextual phones in an M-phone). Accordingly, each GMM is identified by surrounding phonetic context, identity of the central phone, and the particular HMM state of the central phone. Each GMM can store, for example, the number of Gaussian components in the GMM, and weights for each of the components. Diagonal covariance Gaussians, full covariance Gaussians, or other representations can be used. In addition, each GMM can have a dimensionality equal to the dimensionality of the feature vectors used to train the model and/or recognize speech using the model. For example, if a 39-dimensional feature vector is used to describe speech characteristics, then a 39-dimensional GMM can be used to store data for each of the 39 feature dimensions.

In some implementations, reducers only generate an entry in the acoustic model 140 when at least a minimum number of instances of the training sequence have been received. For example, the reducer 130b determines the number of sets of speech frames that have been accumulated for a training sequence. If the number of frames is greater than or equal to the minimum threshold, the reducer 130b produces a GMM for the training sequence and outputs the <M-phone, GMM> entry to the associative array. If the number of frames is less than the minimum threshold, the training sequence is omitted from the model. In this manner, training of the acoustic model 140 is avoided for training sequences that occur infrequently in the input data. In some implementations, the number of Gaussian components in a given GMM is determined based on the number of speech frames aligned against a particular HMM state of a phone during training. For example, a GMM can be sized as a function of the number of frames, n, using a log-linear rule:

$$\log(\text{no. mix components}) = \log(\beta) + \alpha \cdot \log(n),$$

where $\beta$ and $\alpha$ are empirically derived constants, selected to set an appropriate number of Gaussian mixture components in a GMM. $\beta$ can represent a default number of mixture components and a can control the degree to which additional mixture components are included. Typically, a has α value of less than one. Using the training techniques described herein, large numbers of Gaussian mixture components can be used to model a given HMM state and phonetic context. In some implementations, 50, 100, 500, or 1000 or more Gaussian mixture components can be included in a context-dependent GMM that models an HMM state.

In some implementations, the reducers use a subset of the sets of speech frames for a given training sequence when the number of sets of speech frames exceeds a threshold. For example, when the number of instances of training data for a training sequence exceeds the threshold, the reducer can use reservoir sampling techniques to produce a GMM based on a proper subset of the training data instances.

To use the trained acoustic model 140, a system can look up the GMM for a particular phonetic context of interest. For a test sequence of phones, an appropriate partitioning key is determined based on the central triphone in the sample sequence. The partitioning key identifies the particular partition of the distributed array that stores the data for the test sequence (and for all other phonetic contexts that include the same central triphone). Within the identified partition of the distributed array, the sample sequence itself can act as a key used to look up the corresponding GMM for the test sequence, if one exists in the array.

Figure 4:
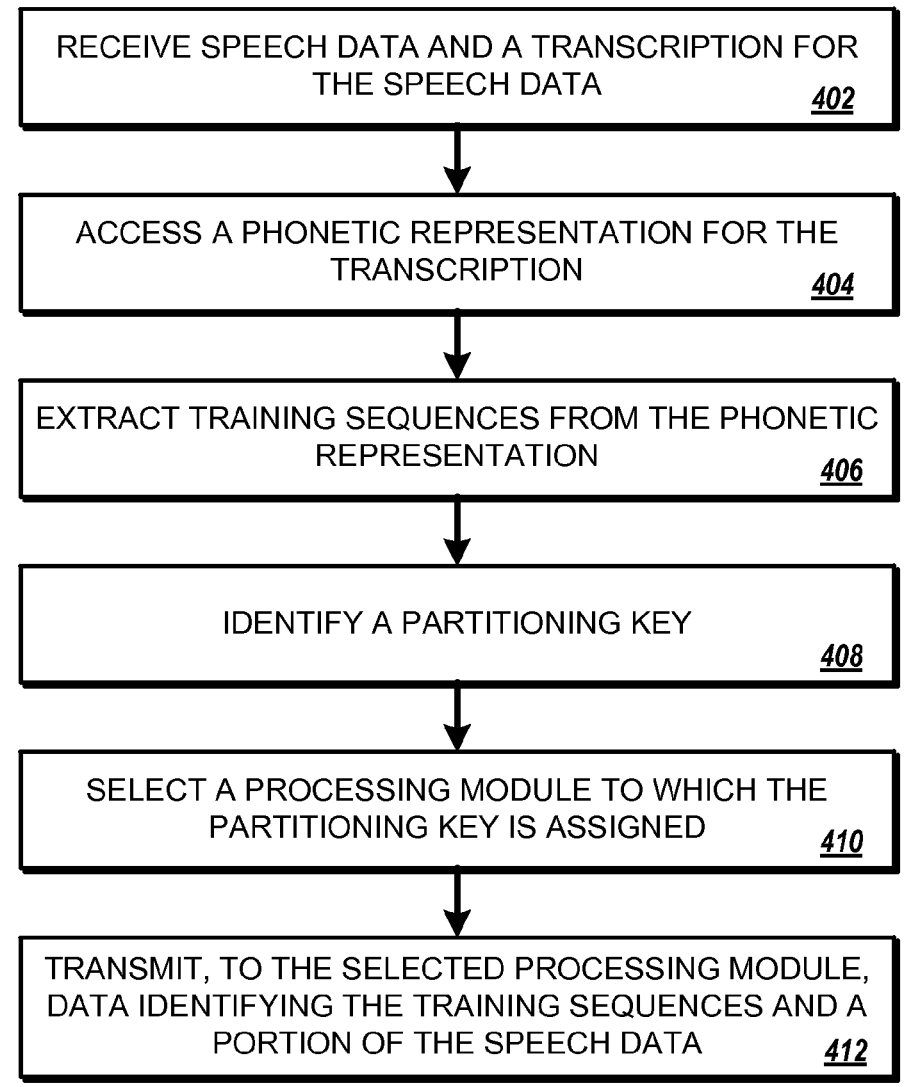
FIG. 4 is a flow diagram that illustrates an example of a process for training an acoustic model.

FIG. 4 is a flow diagram that illustrates an example of a process 400 for training an acoustic model. Briefly, speech data and a transcription for the speech data are received. A phonetic representation for the transcription is accessed. Training sequences are extracted from the phonetic representation. A partitioning key is identified. A processing module to which the partitioning key is assigned is selected. Data identifying the training sequences and a portion of the speech data is transmitted to the selected processing module.

In further detail, speech data and a transcription for the speech data are received (402). The speech data can include feature vectors that indicate speech characteristics. A feature vector can be received for each of multiple speech frames, where each speech frame represents, for example, 10 milliseconds of speech. The speech data and the transcription can be received at a mapper processing module.

A phonetic representation for the transcription is accessed (404). The phonetic representation can be a sequence of context-independent phones.

Training sequences are extracted from the phonetic representation (406). The training sequences are extracted for a particular phone in the phonetic representation. For example, the particular phone can be a central phone in each of the training sequences. Each of the training sequences can include a different set of contextual phones surrounding the particular phone. For example, each of the training sequences can be an M-phone, with a different integer value of M, as described above. The extracted sequences can include at least, for example, a first sequence that includes one contextual phone before the particular phone and one contextual phone after the particular phone, a second sequence that includes two contextual phones before the particular phone and two contextual phones after the particular phone, and a third sequence that includes three contextual phones before the particular phone and three contextual phones after the particular phone. Each of the training sequences can be sequences of consecutive phones in the phonetic representation.

A partitioning key is identified based on a sequence of phones that occurs in each of the training sequences (408). The partitioning key can be identified based on a sequence of two or more consecutive phones that occurs in each of the training sequences. The partitioning key can be based on a sequence that includes at least one contextual phone before the particular phone and at least one contextual phone after the particular phone. The sequence of phones used to identify the partitioning key can be the central triphone, which can be shared by all of the training sequences. In some implementations, a partitioning key is identified for each of the training sequences, and the same partitioning key is identified for each of the training sequences.

A processing module, to which the identified partitioning key is assigned, is selected from among a plurality of processing modules (410). The selected processing module is designated to train a portion of an acoustic model that corresponds to the identified partitioning key.

Data identifying the training sequences and a portion of the speech data are transmitted to the selected processing module (412). The data can be transmitted to the selected processing module and not transmitted to any other processing module assigned to generate a portion of the acoustic model. The portion of the speech data that is transmitted can be a portion that corresponds to the training sequence that includes the most contextual phones.

To transmit the portion of the speech data, an instance of speech data can be transmitted for fewer than all of the training sequences. The portion of speech data that is transmitted can be speech data corresponding to the training sequence that includes the most contextual phones. In some implementations, additional instances of speech data are not transmitted for the other training sequences. In other words, speech data can be transmitted with only the longest training sequence of the training sequences.

The process 400 can include receiving, at the selected processing module, the data identifying the training sequences and the portion of the speech data that corresponds to the training sequence that includes the most contextual phones. At the selected processing module, a different subset of the received speech data can be accessed for each of the training sequences.

In some implementations, the training sequences are first training sequences that each include the same central triphone. The partitioning key is identified based on the central triphone included in the first training sequences. Second training sequences that include the central triphone can also be extracted from a second phonetic representation for second speech data. Data identifying the second training sequences can be transmitted to the same processing module to which the data identifying the first training sequences is transmitted. For example, a partitioning key can be identified for one or more of the second training sequences based on the central triphone, and the partitioning key can be the same partitioning key identified for the first training sequences.

In some implementations, the process 400 includes receiving, at the selected processing module, the data identifying the training sequences and the portion of the speech data. At the selected processing module, speech data for the training sequences can be aggregated with speech data for other instances of the training sequences. A model for a first training sequence of the training sequences can be generated based on the aggregated speech data for the first training sequence. The model can be a context-dependent, state-specific GMM. For example, the model can be a context-dependent GMM dependent on the sequence of contextual phones included in the first training sequence, where the GMM models the output distribution of a HMM state of a central phone of the first training sequence.

The generated model can be stored in a distributed associative array. For example, the generated model can be stored in a partition of the distributed associative array that is associated with the identified partitioning key. The generated model can be stored in the distributed associative array in association with a key that uniquely corresponds to the first training sequence. For example, the key can be associated with the model for the first training sequence, and in the distributed associative array the key is not associated with any model for any other training sequence.

In some implementations, the selected processing module determines that the aggregated speech data includes data for fewer than a threshold number of instances of a second training sequence of the training sequences. In response to the determination, the selected processing module does not generate a model for the second training sequence.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is

1. A system comprising:
    one or more computers and one or more storage devices storing instructions that are operable, when executed by the one or more computers, to cause the one or more computers to perform operations comprising:
        receiving speech data and data identifying a transcription for the speech data;
        accessing a phonetic representation for the transcription;
        extracting training sequences from the phonetic representation for a particular phone in the phonetic representation, the training sequences comprising two or more training sequences that include (i) a particular sequence of multiple phones and (ii) a different number of contextual phones surrounding the particular phone;
        identifying a partitioning key for the training sequences based on the particular sequence of multiple phones that occurs in the two or more training sequences;
        selecting, from among a plurality of processing modules, a processing module to which the identified partitioning key is assigned, the processing module being designated to train a portion of an acoustic model that corresponds to the identified partitioning key; and
        transmitting, to the selected processing module, (i) data identifying the training sequences and (ii) a portion of the speech data that corresponds to the training sequence that includes the most contextual phones.

2. The system of claim 1, wherein accessing the phonetic representation for the transcription comprises accessing a phonetic representation comprising context-independent phones.

3. The system of claim 1, wherein receiving speech data comprises receiving feature vectors that indicate speech characteristics.

4. The system of claim 1, wherein transmitting at least a portion of the speech data comprises transmitting a speech data instance for fewer than all of the training sequences in the set of training sequences.

5. The system of claim 1, wherein transmitting the at least a portion of the speech data comprises transmitting the speech data corresponding to the training sequence that includes the most contextual phones, without transmitting additional speech data for the other training sequences to the selected processing module.

6. The system of claim 1, wherein the operations further comprise:
    receiving, at the selected processing module, the data identifying the training sequences and the portion of the speech data that corresponds to the training sequence that includes the most contextual phones; and
    accessing, at the selected processing module, a different subset of the received speech data for each of the training sequences.

7. The system of claim 1, wherein identifying the partitioning key based on the particular sequence of phones that occurs in the two or more training sequences comprises selecting the partitioning key from among a plurality of partitioning keys assigned to different processing modules based on a sequence of two or more consecutive phones that occurs in each of the two or more training sequences.

8. The system of claim 1, wherein identifying the partitioning key based on the particular sequence of phones that occurs in the two or more training sequences comprises identifying the partitioning key based on a sequence in each of the two or more training sequences that includes one contextual phone before the particular phone and one contextual phone after the particular phone.

9. The system of claim 1, wherein identifying the partitioning key based on the particular sequence of phones that occurs in the two or more training sequences comprises identifying a partitioning key for each of the training sequences, wherein the same partitioning key is identified for each of the training sequences extracted for the particular phone.

10. The system of claim 1, wherein the training sequences are first training sequences that each comprise a same central triphone;
    wherein identifying the partitioning key based on the particular sequence of phones that occurs in the two or more training sequences comprises identifying the partitioning key based on the same central triphone included in the first training sequences; and
    wherein the operations further comprise transmitting, to the processing module and not to any of the other processing modules in the plurality of processing modules, data identifying second training sequences comprising the same central triphone included in the first training sequences, the second training sequences being extracted from a phonetic representation for a transcription for second speech data.

11. The system of claim 1, wherein extracting the training sequences for the particular phone in the phonetic representation comprises identifying at least
    a first sequence that includes one contextual phone before the particular phone and one contextual phone after the particular phone,
    a second sequence that includes two contextual phones before the particular phone and two contextual phones after the particular phone, and
    a third sequence that includes three contextual phones before the particular phone and three contextual phones after the particular phone.

12. The system of claim 1, wherein extracting the training sequences for the particular phone in the phonetic representation comprises extracting sequences of consecutive phones in the phonetic representation.

13. The system of claim 1, wherein the operations further comprise:
    receiving, at the selected processing module, the data identifying the training sequences; and
    aggregating, at the selected processing module, the portion of the speech data with speech data for other instances of the training sequences.

14. The system of claim 13, wherein the operations further comprise:
    generating, at the selected processing module, a model for a first training sequence of the training sequences based on the aggregated speech data for first the training sequence; and
    storing the generated model in a distributed associative array, the generated model being stored in a partition of the distributed associative array being associated with the identified partitioning key.

15. The system of claim 14, wherein generating the model for the first training sequence comprises generating a context-dependent Gaussian mixture model dependent on the sequence of contextual phones included in the first training sequence, the Gaussian mixture model representing the output distribution of a Hidden Markov Model state of a central phone of the first training sequence.

16. The system of claim 14, wherein storing the generated model in the distributed associative array comprises storing the generated model in the distributed associative array such that the generated model is associated with a key that uniquely corresponds to the first training sequence.

17. The system of claim 13, wherein the operations further comprise:
    determining, at the selected processing module, that the aggregated speech data includes data for fewer than a threshold number of instances of a second training sequence of the training sequences; and
    in response to determining that the aggregated speech data includes data for fewer than the threshold number of instances of the second training sequence, not generating a model for the second training sequence.

18. A computer-implemented method, comprising:
    receiving speech data and data identifying a transcription for the speech data;
    accessing a phonetic representation for the transcription;
    extracting training sequences from the phonetic representation for a particular phone in the phonetic representation, the training sequences comprising two or more training sequences that include (i) a particular sequence of multiple phones and (ii) a different number of contextual phones surrounding the particular phone;
    identifying a partitioning key for the training sequences based on the particular sequence of multiple phones that occurs in the two or more training sequences;
    selecting, from among a plurality of processing modules, a processing module to which the identified partitioning key is assigned, the processing module being designated to train a portion of an acoustic model that corresponds to the identified partitioning key; and
    transmitting, to the selected processing module, (i) data identifying the training sequences and (ii) a portion of the speech data that corresponds to the training sequence that includes the most contextual phones.

19. The computer-implemented method of claim 18, wherein identifying the partitioning key based on the particular sequence of phones that occurs in the two or more training sequences comprises selecting the partitioning key from among a plurality of partitioning keys assigned to different processing modules based on a sequence of two or more consecutive phones that occurs in each of the two or more training sequences.

20. A non-transitory computer storage medium encoded with a computer program, the program comprising instructions that when executed by one or more computers cause the one or more computers to perform operations comprising:
    receiving speech data and data identifying a transcription for the speech data;
    accessing a phonetic representation for the transcription;
    extracting training sequences from the phonetic representation for a particular phone in the phonetic representation, the training sequences comprising two or more training sequences that include (i) a particular sequence of multiple phones and (ii) a different number of contextual phones surrounding the particular phone;
    identifying a partitioning key for the training sequences based on the particular sequence of multiple phones that occurs in the two or more training sequences;
    selecting, from among a plurality of processing modules, a processing module to which the identified partitioning key is assigned, the processing module being designated to train a portion of an acoustic model that corresponds to the identified partitioning key; and
    transmitting, to the selected processing module, (i) data identifying the training sequences and (ii) a portion of the speech data that corresponds to the training sequence that includes the most contextual phones.

21. A system comprising:
    one or more computers and one or more storage devices storing instructions that are operable, when executed by the one or more computers, to cause the one or more computers to perform operations comprising:
        assigning a plurality of partitioning keys to a plurality of processing modules, each partitioning key being assigned to only one of the plurality of processing modules, the partitioning keys corresponding to non-overlapping sets of phonetic sequences;
        receiving speech data for an utterance and data identifying a transcription for the utterance;
        accessing a phonetic representation for the transcription;
        extracting, for a particular phone in the phonetic representation, multiple training sequences from the phonetic representation, each of the multiple training sequences including (i) a particular sequence of multiple phones and (ii) a different number of contextual phones surrounding the particular phone, wherein the particular phone corresponds to a central position in each of the multiple training sequences;
        selecting, from among the plurality of assigned partitioning keys, a partitioning key that corresponds to each of the multiple training sequences based on a sequence of multiple phones that occurs in each of the multiple training sequences;
        selecting a processing module from among the plurality of processing modules based on the identified partitioning key, the selected processing module being designated to train a portion of an acoustic model corresponding to the identified partitioning key;
        identifying a portion of the speech data that corresponds to a training sequence of the multiple training sequences that includes the most contextual phones; and
        transmitting, to the selected processing module, (i) data identifying the training sequences and (ii) data indicating the portion of the speech data that corresponds to the training sequence that includes the most contextual phones.

* * * * *